(12) United States Patent
Rajendran et al.

(10) Patent No.: US 9,924,027 B2
(45) Date of Patent: Mar. 20, 2018

(54) WEARABLES DISTRACTION REDUCTION WHILE DRIVING

(71) Applicant: Panasonic Automotive System Company of America, Division of Panasonic Corporation of North America, Peachtree City, GA (US)

(72) Inventors: Shantha Kumari Rajendran, Farmington Hills, MI (US); Padhu Kanagaraj, Farmington Hills, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/445,136

(22) Filed: Feb. 28, 2017

(65) Prior Publication Data

US 2017/0264736 A1    Sep. 14, 2017

Related U.S. Application Data

(60) Provisional application No. 62/305,094, filed on Mar. 8, 2016.

(51) Int. Cl.
| | |
|---|---|
| *H04M 1/72* | (2006.01) |
| *H04M 1/725* | (2006.01) |
| *B60K 35/00* | (2006.01) |
| *B62D 1/04* | (2006.01) |

(52) U.S. Cl.
CPC ......... *H04M 1/72577* (2013.01); *B60K 35/00* (2013.01); *B62D 1/04* (2013.01); *H04M 1/72569* (2013.01); *B60K 2350/357* (2013.01); *B60Y 2400/306* (2013.01)

(58) Field of Classification Search
CPC ............ H04W 4/008; H04M 1/72569; H04M 1/72577; G06Q 30/0601; G06Q 10/067; G06Q 10/10; G06Q 30/02; G06Q 40/12; G06Q 20/32; G06Q 20/3278; B60K 2350/357; B60K 35/00
See application file for complete search history.

(56) References Cited

U.S. PATENT DOCUMENTS

| | | | | |
|---|---|---|---|---|
| 9,473,509 | B2* | 10/2016 | Arsanjani | H04L 63/107 |
| 9,542,781 | B2* | 1/2017 | Hatton | G07C 5/0816 |
| 9,682,623 | B2* | 6/2017 | Kim | B60K 28/066 |
| 2015/0161836 | A1* | 6/2015 | Park | G07C 9/00134 340/5.51 |
| 2016/0311440 | A1* | 10/2016 | Gan | B60K 28/06 |
| 2017/0082649 | A1* | 3/2017 | Tu | G01P 13/00 |
| 2017/0264736 | A1* | 9/2017 | Rajendran | H04M 1/72577 |

* cited by examiner

*Primary Examiner* — Diane Mizrahi
(74) *Attorney, Agent, or Firm* — Laurence S. Roach, Esq

(57) ABSTRACT

An automotive wearable electronic device arrangement for a motor vehicle includes an indicator device indicating a state of an operating parameter of the vehicle. A wireless communication device is communicatively coupled to the indicator device and detects that a driver is wearing a wearable electronic device. The detecting includes receiving a signal from the wearable electronic device. The wireless communication device transmits a signal to the wearable electronic device instructing the wearable electronic device to cease issuing notifications to the driver. The transmitting is dependent upon a state of an operating parameter indicated by the indicator device.

20 Claims, 5 Drawing Sheets

WEARABLES DISTRACTION REDUCTION WHILE DRIVING

CROSS-REFERENCED TO RELATED APPLICATIONS

This application claims benefit of U.S. Provisional Application No. 62/305,094 filed on Mar. 8, 2016, which the disclosure of which is hereby incorporated by reference in its entirety for all purposes.

FIELD OF THE INVENTION

The disclosure relates to wearable electronic devices used by a driver of a motor vehicle while driving.

BACKGROUND OF THE INVENTION

A problem is that drivers of a vehicle are sometimes distracted by their wearable electronic devices while driving. Smart watches and wearables are used by drivers to get notifications about health, incoming calls, text messages, emails, which are separate from smart phone app-related notifications. These notifications from wearable electronic devices are useful and reduce distraction of the users from larger smart phone displays, by giving concise information in the wrist. However, these notifications from. wearable electronic devices may be distracting to the driver while driving and may even be dangerous to the driver and other people around him. For example, a driver receiving the "time to stand up" notification issued by the Apple Watch during an hour-long office drive does not make sense, and is definitely distracting. Email notifications and app-related notifications may also not be helpful to receive while driving. The smart watches/wearables user interface is not very convenient to use while holding the steering wheel, and may be even dangerous to operate while driving.

Some automotive OEMs provide smart watch apps which allow the user to remotely access the vehicles. But currently, car-to-smart watch integration is not available to reduce driver distraction.

SUMMARY

The present invention may reduce driver distraction from wearable device notifications by enabling communication between smart watches/wearables and automotive electronics such as steering wheel controls, instrument clusters, and/or infotainment units, In one embodiment, the invention comprises an automotive wearable electronic device arrangement, including an indicator device indicating a state of an operating parameter of the vehicle. A wireless communication device is communicatively coupled to the indicator device and detects that a driver is wearing a wearable electronic device. The detecting includes receiving a signal from wearable electronic device. The wireless communication device transmits a signal to the wearable electronic device instructing the wearable electronic device to cease issuing notifications to the driver. The transmitting is dependent upon a state of an operating parameter indicated by the indicator device.

In another embodiment, the invention comprises a method of operating an automobile driven by a driver wearing a wearable electronic device. The method includes indicating a state of an operating parameter of the automobile. It is detected that a driver is wearing a wearable electronic device. The detecting includes receiving a signal from the wearable electronic device. A signal is transmitted to the wearable electronic device instructing the wearable electronic device to cease issuing notifications to the driver. The transmitting is dependent upon the indicated state of the operating parameter.

In yet another embodiment, the invention comprises a wearable electronic device arrangement for a motor vehicle, including a steering wheel grip sensor detecting a driver of the vehicle gripping a steering wheel of the vehicle. An indicator device indicates a state of an operating parameter of the vehicle. A wireless communication device is communicatively coupled, to the steering wheel grip sensor and to the indicator device. The wireless communication device detects that a driver is wearing a wearable electronic device. The detecting includes receiving a signal from the wearable electronic device. The wireless communication device transmits a signal to the wearable electronic device instructing the wearable electronic device to cease issuing notifications to the driver. The transmitting is dependent upon whether the steering Wheel grip sensor detected a driver of the vehicle gripping a steering wheel of the vehicle, and upon a state of an operating parameter indicated by the indicator device.

An advantage of the present invention is that it may prevent distractions to the driver by disabling notifications on smart wearable devices worn on the wrist.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
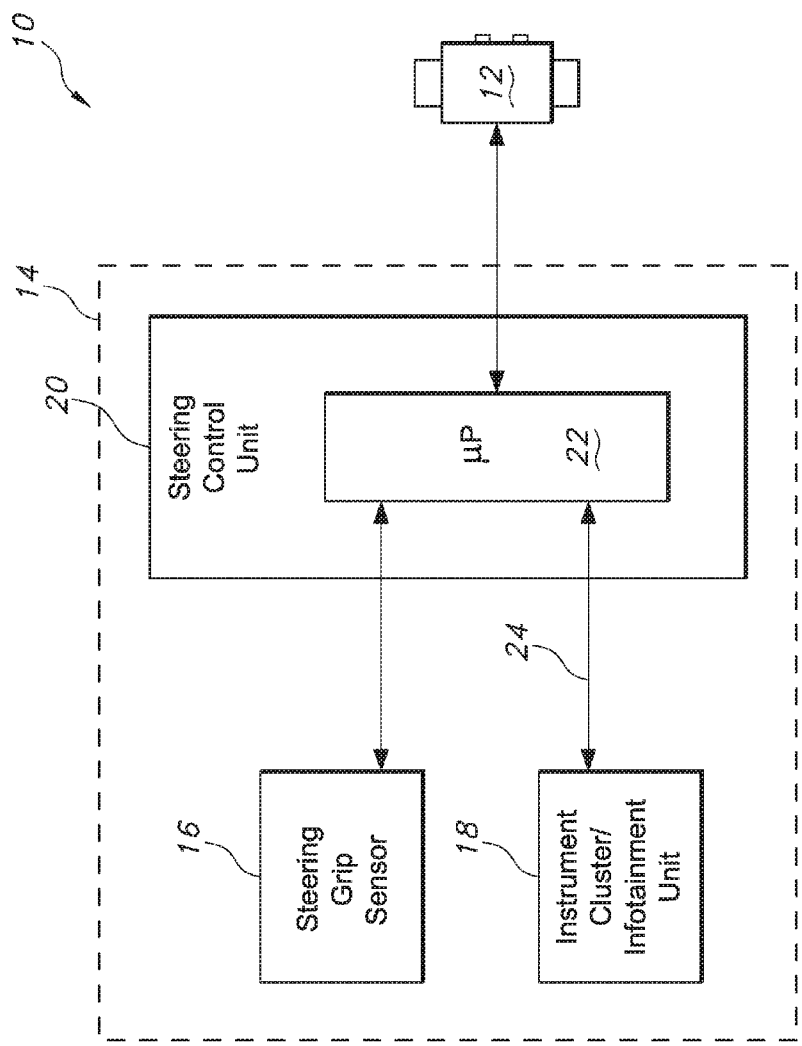
FIG. 1 is a block diagram of one example embodiment of an automotive wearable electronic device arrangement of the present invention.

FIG. 1 illustrates in a one embodiment of an automotive wearable electronic device arrangement 10 of the present invention, including a wearable electronic device 12 and a motor vehicle 14 including a steering wheel grip sensor 16, an instrument cluster/infotainment unit 18, and a steering wheel control unit 20. Wearable electronic device 12, steering wheel grip sensor 16, and instrument cluster/infotainment unit 18 may each be in bi-directional communication with an electronic processor 22 of steering wheel control unit 20.

The steering wheel grip sensor 16 may detect the hand hold of the driver on the steering wheel. The steering wheel electronic unit 20 may use Infra-Red (IR), Near Field Communication (NFC), or any such short-range communication frequency to communicate with or otherwise detect smart watch/wearable electronic device 12, which is being worn on the driver's hands.

When wearable device 12 is detected, steering wheel electronic unit 20, via a Controller Area Network (CAN), Local Interconnect Network (UN), or any such vehicle communication protocol, communicates, as indicated at 24, with instrument control unit 18 to inform instrument control unit 18 that the driver is possibly wearing a smart wearable device. If the displayed vehicle speed is higher than a threshold speed (e.g., five miles per hour), then instrument cluster 18 notifies steering wheel electronic control unit 20 that driver distraction may be occurring because of the notifications the driver receives from smart wearable device 12. Steering wheel control unit 20 then asks wearable device 12 to disable notifications.

Instrument cluster 18 again notifies steering wheel control unit 20 when the vehicle speed falls below five miles per hour so that steering wheel control unit 20 can instruct wearable electronic device 12 to re-enable notifications. Instrument cluster 18 also can notify steering wheel control unit 20 when the vehicle transmission gear selector is in the "park" position so that steering wheel control unit 20 can instruct wearable electronic device 12 to re-enable notifications. The notifications may be disabled again once the vehicle speed exceeds five miles per hour.

Figure 2:
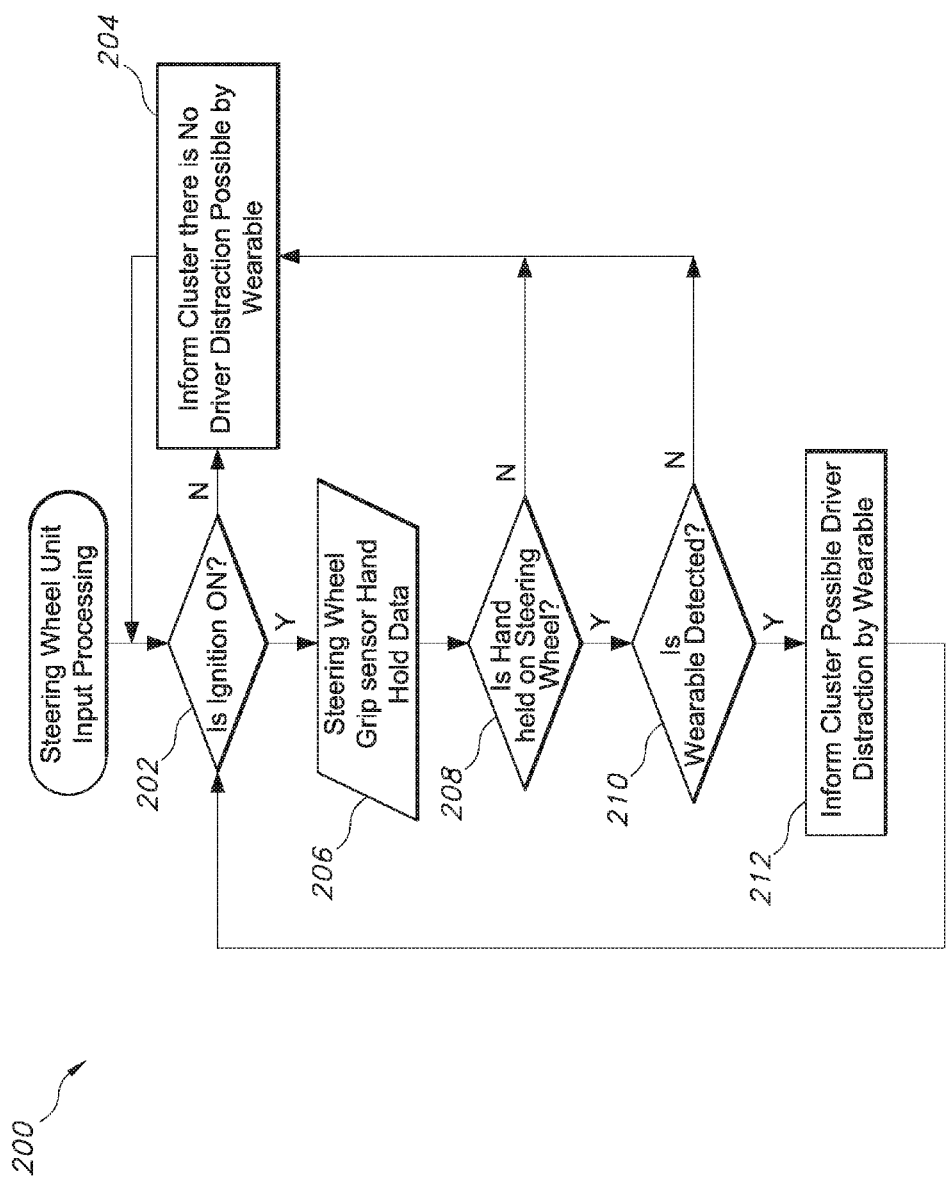
FIG. 2 is a flow chart of one example embodiment of a method of the present invention for steering wheel unit input processing while operating the automotive wearable electronic device arrangement of FIG. 1.

The whole session may end when the vehicle ignition is turned OFF. A new session starts when the vehicle ignition is turned ON and steering wheel unit 20 senses a smart watch 12 being worn by the driver who is holding the steering wheel, FIG. 2 illustrates an example embodiment of a method 200 of the present invention for steering wheel unit input processing while operating automotive wearable electronic device arrangement 10. In a first step 202, it is determined whether the engine ignition is ON. If not, then in step 204 the instrument cluster is informed that it is not possible for the wearable electronic device to distract the driver while he is driving. Conversely, if it is determined in step 202 that the engine ignition is ON, then in step 206, data from steering wheel grip sensor 16 is obtained. Next, in step 208, it is determined, based on the data from steering wheel grip sensor 16, whether the driver's hand is holding the steering wheel. If not, then in step 204 the instrument cluster is informed that it is not possible for the wearable electronic device to distract the driver while he is driving. Conversely, if it is determined in step 208 that the driver's hand is gripping the steering wheel, then it is determined in step 210 whether a wearable device is being worn by the driver. For example, processor 22 may initiate electronic communication with wearable device 12 in order to confirm the presence of the wearable device. The range of the communication may be limited to about two feet in order to communicate with devices worn by the driver and not with devices worn by vehicle passengers, if a wearable device is not detected, then in step 204 the instrument cluster is informed that it is not possible for a wearable electronic device to distract the driver while he is driving. Conversely, if it is determined in step 210 that the driver is wearing an electronic device, then instrument cluster 18 is informed in step 212 that the wearable electronic device may potentially distract the driver. Operation then returns to step 202, and possibly to step 302, which is described below.

Figure 3:
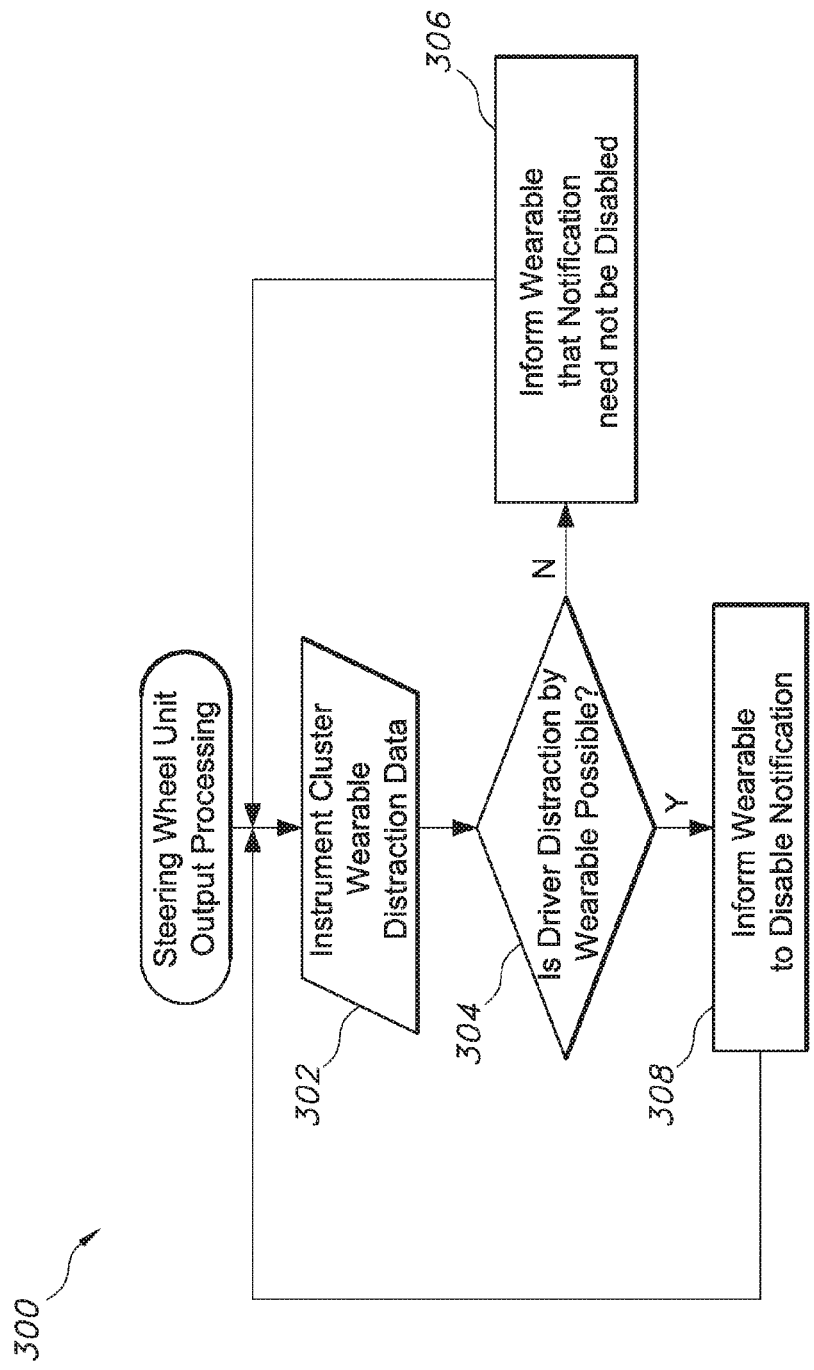
FIG. 3 is a flow chart of one example embodiment of a method of the present invention for steering wheel unit output processing while operating the automotive wearable electronic device arrangement of FIG. 1.

FIG. 3 illustrates an example embodiment of a method 300 of the present invention for steering wheel unit output processing while operating automotive wearable electronic device arrangement 10. In a first step 302, data regarding possible driver distraction by an electronic wearable device is obtained from instrument cluster 18. For example, instrument cluster 18 may inform processor 22 of the vehicle speed. Next, in step 304, it is determined whether it is possible for the driver to be distracted by the electronic wearable device. For example, if instrument cluster 18 informs that the vehicle speed is less than five miles per hour, then it is determined that it is not possible for the driver to be distracted by the electronic wearable device. However, if instrument cluster 18 informs that the vehicle speed is more than five miles per hour, then it is determined that it is possible for the driver to be distracted by the electronic wearable device. If it is determined in step 304 that it is not possible for the driver to be distracted by the electronic wearable device, then operation proceeds to step 306, where wearable electronic device 12 is informed that its notifications need not be disabled. Conversely, if it is determined in step 304 that it is possible for the driver to be distracted by the electronic wearable device, then operation proceeds to step 308, where wearable electronic device 12 is informed that its notifications need to be disabled. Operation then returns to step 302.

Figure 4:
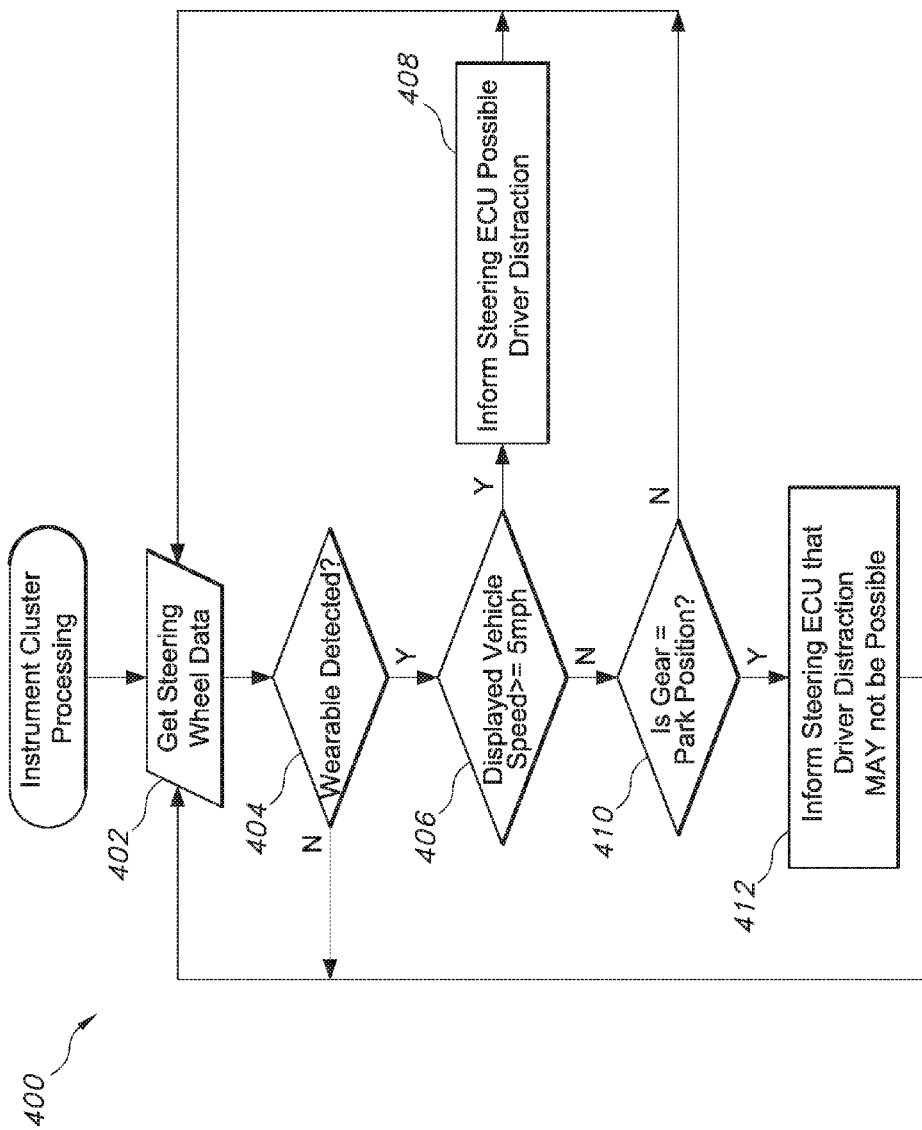
FIG. 4 is a flow chart of one example embodiment of a method of the present invention for instrument cluster processing while operating the automotive wearable electronic device arrangement of FIG. 1.

FIG. 4 illustrates an example embodiment of a method 400 of the present invention for instrument cluster processing while operating automotive wearable electronic device arrangement 10. In a first step 402, data from steering wheel control unit processor 22 is obtained. For example, processor 22 may provide data regarding its attempts to communicate with a wearable electronic device. Next, in step 404, it is determined whether the data from processor 22 indicates that a wearable electronic, device is being worn by the driver. For example, if a wearable electronic device communicates with processor 22, then it is determined that the driver is wearing an electronic device. Conversely, if no wearable electronic device communicates with processor 22, then it is determined that the driver is not wearing an electronic device. If it is determined in step 404 that the driver is not wearing an electronic device, then operation returns to step 402. Else, if it is determined in step 404 that the driver is wearing an electronic device, then operation proceeds to step 406, where it is determined whether the displayed vehicle speed is greater than or equal to five miles per hour. If the displayed vehicle speed is greater than or equal to five miles per hour, then in step 408, steering wheel processor 22 is informed that driver distraction from notifications from a wearable electronic device is possible. Operation then returns to step 402. Conversely, if it is determined in step 406 that the displayed vehicle speed is less than five miles per hour, then in step 410 it is determined whether the transmission gear selector is in the "park" position. If not, then operation then returns to step 402. Conversely, if it is determined in step 410 that the transmission gear selector is in the "park" position, then in step 412, steering wheel processor 22 is informed that driver distraction from wearable device notifications may not be possible. Operation then returns to step 402.

Figure 5:
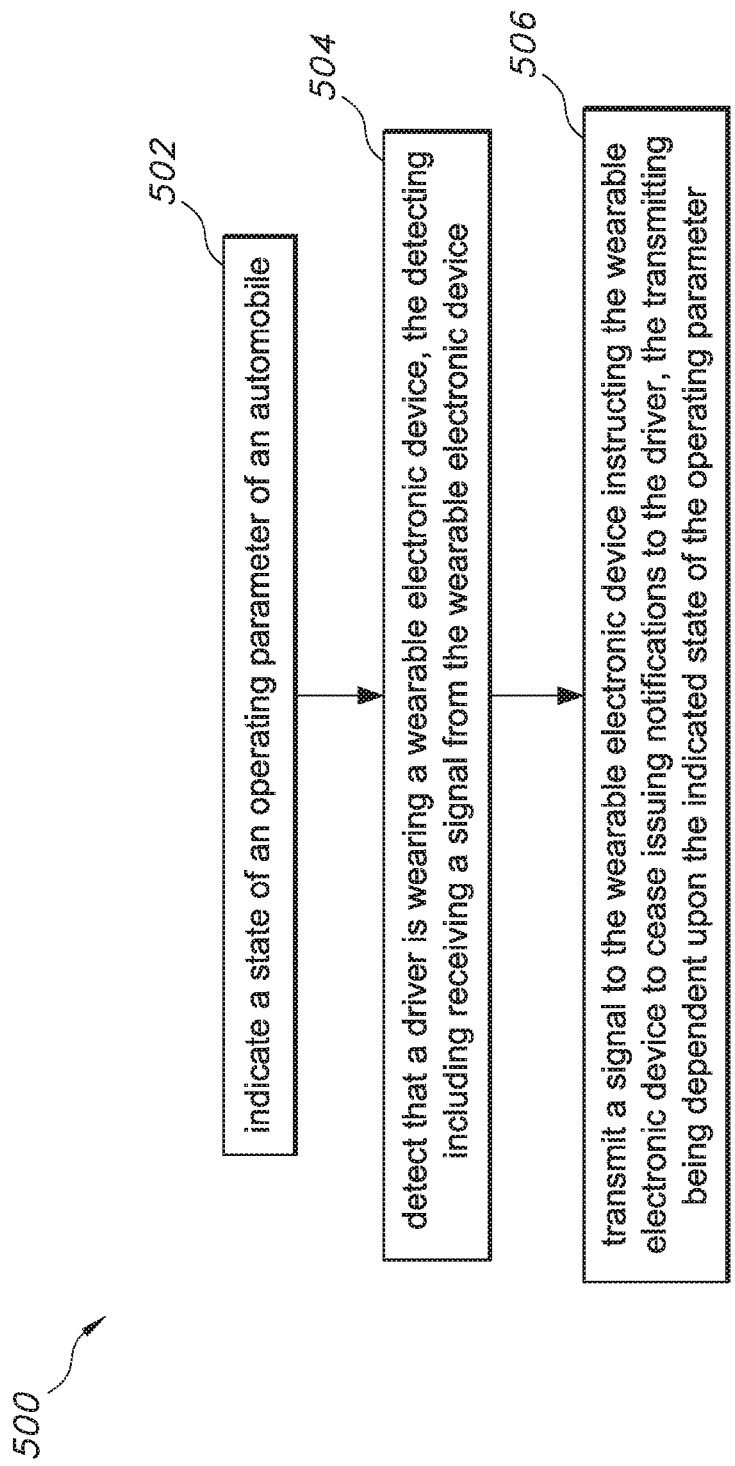
FIG. 5 is a flow chart of one example embodiment of a method of the present invention for operating an automobile driven by a driver wearing a wearable electronic device.

FIG. 5 illustrates one example embodiment of a method 500 of the present invention for operating an automobile driven by a driver wearing a wearable electronic device. In a first step 502, a state of an operating parameter of the automobile is indicated. For example, instrument cluster 18 may indicate a current speed of vehicle 14, expressed in miles per hour.

Next, in step 504, it is detected that a driver is wearing a wearable electronic device. The detecting includes receiving a signal from the wearable electronic device. For example, steering wheel processor 22 may receive a wireless signal from wearable electronic device 12, and thereby processor 22 may detect that a driver is wearing wearable electronic device 12.

In a final step 506, a signal is transmitted to the wearable electronic device instructing the wearable electronic device to cease issuing notifications to the driver. The transmitting is dependent upon the indicated state of the operating parameter. For example, only if instrument cluster 18 indicates that vehicle 14 is traveling faster than 5 miles per hour does processor 22 transmit a signal to wearable electronic device 12 instructing wearable electronic device 12 to cease issuing notifications to the driver, The invention may have been described above as involving the instrument cluster. However, in another embodiment, instead of the instrument cluster, the infotainment unit is used to control driver distraction. Specifically, when the infotainment is put on a lockout, the infotainment unit may notify the steering wheel control unit 20 to instruct smart wearable device 12 to disable notifications.

The invention may have been described above as communicating directly with the wearable electronic device. However, in another embodiment, instead of directly communicating with the smart wearable device for disabling/enabling notifications, the instrument cluster or infotainment unit may communicate with a smartphone of the driver via Bluetooth to request that the smartphone enable/disable notifications from the smart wearable device. The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or wound, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A wearable electronic device arrangement for a motor vehicle, the arrangement comprising:
   an indicator device configured to indicate a state of an operating parameter of the vehicle; and
   a wireless communication device communicatively coupled to the indicator device and configured to:
      detect that a driver is wearing a wearable electronic device, the detecting including receiving a signal from the wearable electronic device; and
      transmit a signal to the wearable electronic device instructing the wearable electronic device to not issue notifications to the driver, the transmitting being dependent upon a state of an operating parameter indicated by the indicator device.

2. The wearable electronic device arrangement of claim 1 wherein the operating parameter comprises a vehicle speed.

3. The wearable electronic device arrangement of claim 1 wherein the operating parameter comprises a position of a transmission gear selector.

4. The wearable electronic device arrangement of claim 1 wherein the transmitting is dependent upon whether the engine ignition is ON.

5. The wearable electronic device arrangement of claim 1 wherein the operating parameter comprises a lockout selection of an infotainment system of the vehicle.

6. The wearable electronic device arrangement of claim 1 further comprising a sensor configured to sense a presence of a hand of the driver, the wireless communication device being configured to initiate communication with the wearable electronic device in response to the sensor sensing the presence of the hand of the driver.

7. The wearable electronic device arrangement of claim 6 wherein the sensor is configured to sense the hand of the driver gripping a steering wheel of the vehicle.

8. A method of operating an automobile driven by a driver wearing a wearable electronic device, the method comprising:
   indicating a state of an operating parameter of the automobile;
   detecting that a driver is wearing a wearable electronic device, the detecting including receiving a signal from the wearable electronic device; and
   transmitting a signal to the wearable electronic device instructing the wearable electronic device to cease issuing notifications to the driver, the transmitting being dependent upon the indicated state of the operating parameter.

9. The method of claim 8 wherein the operating parameter comprises a vehicle speed.

10. The method of claim 8 wherein the operating parameter comprises a position of a transmission gear selector.

11. The method of claim 8 wherein the transmitting is dependent upon whether the engine ignition is ON.

12. The method of claim 8 wherein the operating parameter comprises a lockout selection of an infotainment system of the vehicle.

13. The method of claim 8 further comprising:
   sensing a presence of a hand of the driver; and
   initiating communication with the wearable electronic device in response to the sensing of the presence of the hand of the driver.

14. The method of claim 8 wherein the sensing includes sensing the hand of the driver gripping a steering wheel of the vehicle.

15. A wearable electronic device arrangement for a motor vehicle, the arrangement comprising:
   a steering wheel grip sensor configured to detect a driver of the vehicle gripping a steering wheel of the vehicle;
   an indicator device configured to indicate a state of an operating parameter of the vehicle; and
   a wireless communication device communicatively coupled to the steering wheel grip sensor and the indicator device and configured to:
      detect that a driver is wearing a wearable electronic device, the detecting including receiving a signal from the wearable electronic device; and
      transmit a signal to the wearable electronic device instructing the wearable electronic device to cease issuing notifications to the driver, the transmitting being dependent upon:
         whether the steering wheel grip sensor detected a driver of the vehicle gripping a steering wheel of the vehicle; and
         a state of an operating parameter indicated by the indicator device.

16. The wearable electronic device arrangement of claim 15 wherein the operating parameter comprises a vehicle speed.

17. The wearable electronic device arrangement of claim 15 wherein the operating parameter comprises a position of a transmission gear selector.

18. The wearable electronic device arrangement of claim 15 wherein the transmitting is dependent upon whether the engine ignition is ON.

19. The wearable electronic device arrangement of claim 15 wherein the operating parameter comprises a lockout selection of an infotainment system of the vehicle.

20. The wearable electronic device arrangement of claim 15 wherein the wireless communication device is configured to initiate communication with the wearable electronic device in response to the steering wheel grip sensor detecting a driver of the vehicle gripping a steering wheel of the vehicle.

* * * * *